Oct. 10, 1961
J. FOGLIANO
3,003,244
SELF-ADJUSTING ANGLE SQUARE OR RULE
Filed March 25, 1957
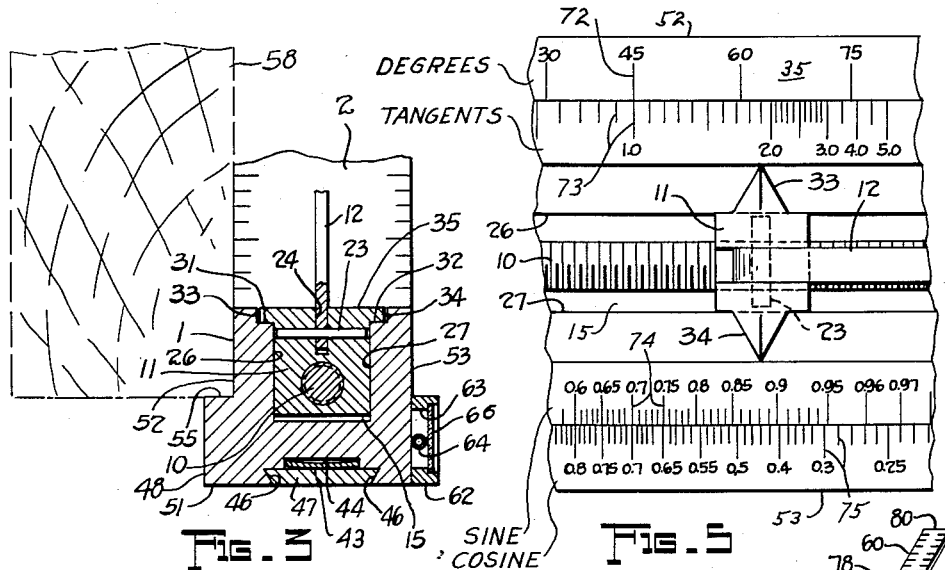
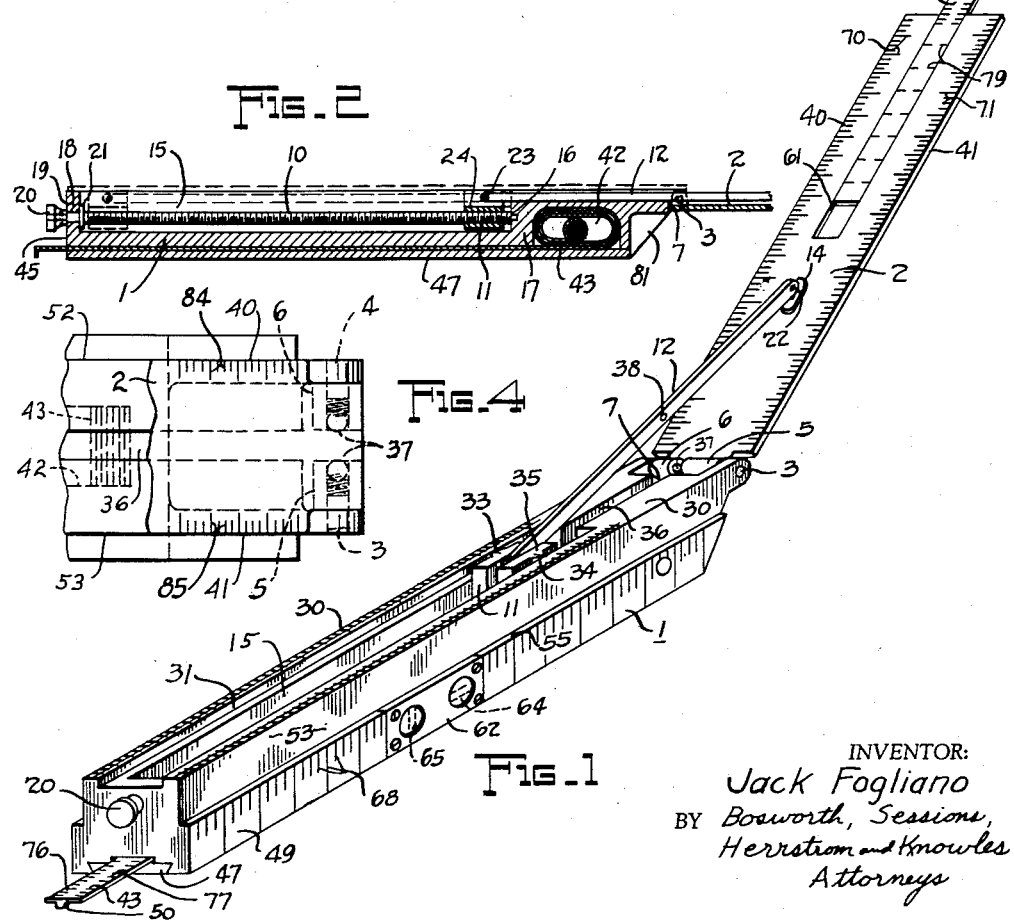
INVENTOR:
Jack Fogliano
BY Bosworth, Sessions,
Herstrom and Knowles
Attorneys

United States Patent Office 3,003,244
Patented Oct. 10, 1961

3,003,244
SELF-ADJUSTING ANGLE SQUARE OR RULE
Jack Fogliano, 18020 North Blvd., Maple Heights, Ohio
Filed Mar. 25, 1957, Ser. No. 648,302
11 Claims. (Cl. 33—88)

This invention relates to measuring tools and more particularly to adjustable squares of the type used by carpenters and masons in building construction.

The principal object of the invention is to provide a compact unitary working tool for use in laying out, gauging, checking and measuring building construction. To this end, it is contemplated to provide a box-like body bearing marks and indices constituting a measuring scale and having hinged to it at one end an arm or blade which also bears scale marks and indices. The blade, when retracted, covers the full length of the body and constitutes a closure for the latter and, when extended, doubles the effective length of the device for measuring purposes, a specialized objective of the invention is the provision of means for holding the blade in the fully extended position. As as refinement of this aspect of the invention the body or the blade, and preferably both the body and the blade, carry extensible scales which increase the overall measuring capabilities of the device when the blade is fully extended, and more particularly, permit the measurement of inside dimensions such as door and window openings.

Another object is to provide a device having a swingable blade and means for moving the blade to different angular positions relative to the body and thereby constituting a device advantageous in laying out roof rafters, gables and the like. As a refinement of this aspect of the invention, the means for adjusting and holding the blade includes a movable adjusting block having an index pointer that travels on a path along the longitudinal axis of the body marked at intervals with indices representing the corresponding angularity of the blade relative to the body so that the blade angle can be set without the use of a protractor or supplemental gauging tool. The path of the adjusting block can be marked with the trigonometric functions as well as degrees to facilitate the adjustment of the blade without calculation when data is received in terms of such functions.

A further objective is to provide a measuring device having a full length offset providing a rabbet receivable over the edge corner of a joist, stud, rafter or beam so as to facilitate locating and holding the device in true parallel relation to such member in effecting a measurement. As a specialized version of the longitudinally rabbeted arrangement a spirit level is recessed into an outside face of the body adjacent the locating rabbet so that in applying the rabbet body to the edge corner of a structural building member the spirit level is automatically positioned adjacent such structural member and fully exposed for inspection.

A still further object is the provision of an adjustable square device comprising a body having a blade hinged on one end and having an extensible scale withdrawable from the other end of the body for use in laying out a predetermined distance between the end of a structural member and pivot axis of the swingable arm. In a refined version of the invention the box body of the device is formed with an internal chamber that receives and stores a flexible metal tape scale in coil form that can be projected and retracted at will. The flexible metal scale is guided in the body for rectilinear movement along a path paralleling the longitudinal axis of the body.

Other objects and advantages relate to structural features and combinations of parts apparent in the following description made in connection with the accompanying drawings forming a part of the specification.

In the drawings:

FIGURE 1 is an isometric perspective showing a hinged blade adjustable square embodying the principles of and representing the best known mode of practicing the present invention;

FIGURE 2 is a longitudinal section through the device of FIGURE 1;

FIGURE 3 is a transverse sectional detail through the devices showing the slide which controls the angularity of the blade and the use of the external rabbet in positioning the device over the edge corner of a structural member;

FIGURE 4 is a fragmentary plan view of the hinge end of the device showing the hinge arrangement for mounting the adjustable blade on one end of the body; and FIGURE 5 is a fragmentary detail showing representative indicia or markings on the scales paralleling the path of the blade adjusting block.

The adjustable square shown comprises an elongated box-like body indicated generally at 1 which may be carved in wood or cast in plastic or metal such as aluminum. At one end of the body, the right hand end as viewed in FIGURES 1 and 4, a swingable blade 2 is attached as by pins 3, 4 to swing from a fully closed position illustrated in FIGURE 4 and indicated by the broken lines in FIGURE 2 to a fully extended position indicated by the solid lines of FIGURE 2. To accommodate this 180° swinging movement of the blade 2 the latter is formed or provided with depending bosses 5, 6 having aligned openings that receive the inner ends hinged pins 3, 4. The axis of such openings are transverse to the longitudinal dimension of the blade. The outer ends of the hinge pins are received in aligned apertures in the end portions of the body which are located on opposite sides of a recess 7 provided to receive the bosses 5, 6 of the blade.

Adjustment of the blade 2 is accomplished by a lead screw 10 which actuates a block 11 connected by rigid link 12 to a bracket 14 fast to the inside face of the blade. The lead screw 10 extends longitudinally through an open topped channel or recess 15 formed in the body 1, the inner end 16 of the lead screw being received in a socket in partition wall 17 and outer end 18 of the lead screw being received for rotation through end wall 19 of the body and having fast thereon an external thumb wheel 20 by means of which the lead screw is rotated to shift the threaded block axially. A split retaining washer 21 received with a snap fit over a necked down portion of the lead screw 10 bears against the inner face of the end wall 19 to prevent longitudinal shifting of the lead screw.

The link 12 is connected by pin 22 to the blade bracket 14 and by pin 23 to the block 11. Block 11, formed with a slot 24 to receive the link 12 for free swinging movement, is closely confined by confronting walls 26, 27 of the body recess 15 which thus guide the block and prevent its rotation as it travels along the threaded rod or lead screw 10.

Upper face 30 of the body 1 is rabbeted along the opening into the recess 15 to provide runways 31, 32 for aligned pointers 33, 34 which extend laterally from the top of the blade adjusting block 11. These pointers are flush with top surface 35 of the block 11 and with face 30 of the body 1 so that the alignment of hair lines suitably inscribed on pointers 33, 34 with various scale indices on the body face 30 along the margins of the rabbets 31, 32 is readily observed. When the blade 2 is moved to the fully extended position shown by the full lines of FIGURE 2 the connecting link 12 is received in a slot 36 formed in the top surface of the body, the link being thus fully recessed below the body surface 30 so as not to interfere with use of the device in making measurements of length. Furthermore the close confinement of the link 12 by the confronting side walls of the channel recess 36 strengthens the device preventing inadvertent bending or buckling of the link 12. In addition to being received in and confined by the walls of the body slot 36 when the blade 2 is fully extended, the link 12 is received between and confined by the blade bosses 5, 6 that carry the hinge pins 3, 4. Desirably the blade bosses 5, 6 carry spring pressed ball detents 37 which snap into recesses in the link 12 at full extension of the blade so as to retain the blade in such fully extended position. One of the recesses in the link 12 is indicated at 38, FIGURE 1, a similar recess being located on the opposite side of the link.

The blade bracket 14 is centered between side edges 40, 41 of the blade and spaced from the axis of the hinge pins 3, 4 at a relatively short distance such as not more than about one-third the total blade length. Thus the travel of the internally threaded block 11 along the lead screw 10 between the fully closed and fully opened positions of FIGURE 2 amounts approximately to two-thirds the total length of the body 1 it being understood that the body and the blade are of substantially equal length. In the space thus provided between the transverse body partition 17 which carries the inner end of the lead screw 10 and the body end carrying the hinge pins 3, 4 there is formed an internal chamber 42 that receives a coiled scale 43 comprising a thin ribbon of steel or other suitable material which can be projected and retracted along a guide way 44 and through body end 45 remote from the blade hinge pins 3, 4. The guideway 44 is conveniently formed by a longitudinally extending groove having stepped side walls. The confronting side walls 46 of the outer step are inclined to provide a dove tailed slot that receives a longitudinally extending closure slide 47 of uniform width and coextensive in length with the bottom of the body 1. The extensible scale 43 has a free sliding fit in the runway 44 so that it can be pulled out as desired to extend the effective length of the device in use as a length measuring instrument. The extensible scale 43 is marked in suitable units of lineal mensuration such as inches, feet and fractions thereof and of the same character as those inscribed along sides 48, 49 of the body 1. By adding the reading of the extended scale 43 to the length of the body 49, in the same units of lineal measurement, there is obtained a figure which represents the distance from the end of the extensible scale 43 to the axis of the hinge pins 3, 4, a dimension useful in laying out rafter, gables, roofs and the like. For convenience in making such measurements the end of the extensible scale 43 carries a laterally extending finger 50 which may also be used as a grip to facilitate withdrawal, such finger being engageable with the end of the dove tailed closure slide 47 to prevent inadvertent retraction of the extensible scale completely within the chamber 42 or runway 44.

The sides of the body 1 are relieved or rabbeted along their entire length on their side faces which intersect the top face 30, dividing each of the two sides of the body into parallel offset surface portions. The surface portions 48, 49 are adjacent bottom surface 51 of the body and surface portions 52, 53 are adjacent the top surface 30. Shoulders 55 extend the full length of the body one on each side thereof and are parallel to both top and bottom faces 30, 51 which likewise are parallel to one another. The shoulders 55 are thus useful in positioning the device against a member to be measured or marked such as a timber or joist 58 shown in broken lines in FIG. 3. Since the adjustable blade 2 is the same width as the top surface 30 of body 1, it does not project beyond the planes of the upper side wall surfaces 52, 53 the blade can be adjusted to any desired position while holding the device against a timber as shown in FIG. 3.

The automatic locating of the device in parallel relation to the joist or timber 58 by placing the interesting side and shoulder surfaces over an edge corner of the timber as in FIG. 3 permits the user to hold the device in place with one hand while using the other to adjust the blade 2 and, if desired, to mark the timber with the desired angle.

A rigid extension scale 60 is slidably received in a dove tail slot 61 opening through the free end of the blade 2 so that the effective length of the blade can be increased when desired. Both the inside and outside surfaces of the blade 2 and the rigid extension scale 60 are inscribed with units of length of the same type such as inches and feet and fractions thereof, it being understood that the units of length used on the side faces 48, 49, 52 and 53 of the body are of the same character as those used on the inner and outer faces of the blade 2 and the extension scale 60 so that overall cumulative dimensions can be obtained.

The extension scale 60 carried by the blade 2 is some length less than that of blade 2.

Although the blade adjusting link 12 is shown centered between the sides of the body 1 and of blade 2 it is feasible to locate the link toward one side or the other of the center line in which case the rigid extension slide 60 may be made equivalent in length to the blade 2 the dovetail recess 61 for the extension slide likewise extending the full length of the blade.

A spirit level assembly 62 is recessed into the side surface 49 of the body, it being understood that if desired a similar assembly may additionally be recessed into the side surface 48 on the opposite side of the body so that the device can be read from either side. The level assembly 62 comprises a rectilinear metal block drilled for attaching screws by means of which it is secured to the body 1. Recesses 63 receive conventional fluid filled tubes 64 and 65 positioned for use of the device horizontally vertically respectively. Protective windows 66 are received and made fast as by putty in the conventional manner.

To facilitate location of the pivot axis of the blade 2 at any desired point along the length of a member to be inscribed with an angular line, such as the joist or timber 58, the side face portions 48, 49 are each inscribed with linear scales running from the axis of the pivot pins 3, 4. The scale 68 on the side face 49 is laid out, say, in inches and feet. The scale on the side face portion 48 is preferably laid out in different units, such as centimeters, although, if desired, it may be laid out in inches divided into tenths as is customary in scales used by engineers.

The spring metal extension scale 43 is inscribed with a scale or scales laid out in the same units as the scale or scales on the body faces 48, 49, the scales on the extension 43 having their origin at the finger end 50. When using a metric scale on the body side face portion 48, the extension scale 43 is laid out along its edge adjacent the body face 48 with a metric scale 76. When the scale 68 along the body side face portion 49 is laid out in inches and feet, scale 77 on the adjacent edge of the extension scale 43 is similarly laid out in inches and feet.

The rigid extension scale 60 carried by the blade 2 is inscribed with scales 78, 79 laid out in units corresponding, respectively, with the units of the scales 70, 71. The scales 78, 79 have their origin at tip end 80 of the scale 60. By the scale arrangement described, the readings on the extended scales 43 and 60 may be added to the lengths of the scales on the body 1 and blade 2 in arriving at the values of over-all measurements. By use of the rectilinear extension features of the relatively long flexible steel extension 43 or the relatively short rigid extension 60, the making of so-called inside measurements, as in doorway and window openings, is facilitated.

Linear scales 70, 71 are laid out along the inside of the pivoted blade 2, the scale 70 being in the same units as the scale on the side face portion 48 and the scale 71 being in the same units as the scale on the side face portion 49. Furthermore, the linear blade scales 70, 71 have their origins at the axis of the pivot pins 3, 4 so that when the blade 2 is fully opened to the position shown by the full lines of FIG. 2 the device can be employed as a conventional scale, a reading on one of the body scales on the surface portions 48, 49 being added to a reading on the appropriate one of the blade scales 70, 71 to obtain the over-all measurement.

The outside surface of the blade 2 is also inscribed with scale indicia so that the device can be used for linear measurements when the blade is closed against the surface of the body 1. Thus the outside surface of the blade along an edge portion indicated at 84 in FIG. 4 carries a scale of the same units as the scale 76 on the corresponding edge of the flexible metal extension 43; along an edge portion indicated at 85 the outside of the blade carries a scale of the same units of measurement as the scale 77 on the related edge of the flexible extension. Both scales 84, 85 on the outside of the blade 2 have their origins at the pivot end of the device to facilitate adding the values of the blade scales to those of the extension scales in use.

Along those portions of the upper face 30 of the body 1 which border the runways 31, 32 there are inscribed trigonometrical scales. Fragments of such scales are shown in FIG. 5, which represents diagrammatically a central portion of the upper surface of the body and block 11. Scales 72, 73 adjacent the rabbet or runway 31 are laid out in degree values and tangent values, respectively. That is to say, the scales 72, 73, 74, and 75 represent the number of degrees and the value of the tangent, sine and cosine respectively of the angle between the plane of the blade 2 and the top surface 30 of the body when the pointer 33 of the adjusting slide 11 is opposite the corresponding indices of the scales. Thus in using the device the operator can, by manipulating the thumb wheel 20 to traverse the adjusting block 11 in the channel 15, set the blade at any desired angle relative to the body if he knows either the number of degrees, the tangent, the sine or cosine of such angle. This is accomplished by merely selecting the proper index along one of the scales 72–75 and shifting the adjusting block 11 until the appropriate pointer 33 or 34 is opposite the selected index mark.

It is understood that other suitable scales may be used on the upper face 30 in place of or in addition to those shown, such as a scale in terms of pitch useful in the erection of rafters, stairs, and the like.

The lower corner of the body 1 at the hinged end is relieved or cut away as indicated by oblique surface 81 which permits the operator to project a line inscribed along the angularly disposed blade 2 to intersection with the edge of the joist or other member 58 against which one of the shoulders 55 is abutted.

It is thus apparent that the present invention provides an adjustable square which can be readily set at any desired angle for laying out joists, roof rafters and the like, which also functions as a scale for linear measurements of enclosed spaces and which can be used in leveling and plumbing structures. The device can be used with its adjustable blade extended or retracted and such extension and retraction are readily accomplished by the simple turning of a thumb screw which obtains vernier adjustment of the blade to any desired angle.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. An adjustable square comprising an elongated body formed with a longitudinally extending groove having spaced confronting walls, the body also having a flat working face adjacent the groove and through which the groove opens, a blade of substantially the same length as the body, said blade having a flat inside surface inscribed with measuring indices, means hinging one end of the blade to one end of the body adjacent the flat body face for swinging movement of the blade relative to the body between an open position in which the blade extends virtually in the same plane and as a continuation of the flat body face and a closed position in which said inside surface of the blade is disposed flatwise against the flat body face, a lead screw carried by the body and extending longitudinally through the groove, a block carried as a nut on the lead screw for to and fro longitudinal movement in the groove upon rotation of the lead screw, the block being confined by and having sliding engagement with the walls of the groove throughout the extent of the movement of the block longitudinally in the groove to restrain the block against rotation relative to the body and to restrain the block and the lead screw against lateral displacement in the groove, a link having its opposite ends connected, respectively, to the block and blade and arranged so that travel of the block along the lead screw swings the blade about its pivot axis into various positions of angularity relative to the body, said block having a pointer disposed for movement along the flat body face, and said flat body face carrying indices representing angular relationships corresponding to various positions of the block pointer and the blade.

2. An adjustable square as defined in the preceding claim having a recessed runway in the flat face of the body and along the groove, the block pointer extending into the runway and having an exposed surface substantially coplanar with said flat body face.

3. An adjustable square as in claim 1 in which the body is formed with a stepped side surface providing a longitudinally extending shoulder paralleling the flat body face for locating the body along an edge corner of a structural member, said stepped side surface including a surface portion adjacent the working face and parallel to the swinging plane of the blade.

4. An adjustable square as in claim 1 having the end of the body to which the blade is hinged relieved opposite the hinge to provide a flat end face on the block disposed at an acute angle to the working face of the body whereby to permit projection of a line inscribed along the blade to its intersection with a line inscribed along the opposite side of the body when the blade is obtusely angled relative to the body, the hinge axis of the blade lying substantially in the plane of said end face of the block.

5. An adjustable square as in claim 1 in which one end of the lead screw projects from said other end of the body, said one end of the lead screw is spaced from the other end of the body, the body is formed with an internal chamber intermediate said other end of the lead screw and said one end of the body, an elongated ribbonlike flexible scale is coiled in the chamber, the body is formed with a runway from such chamber to said other end of the body and generally parallel to the groove, and the flexible scale extends through such runway and is projectible beyond said other end of the body.

6. An adjustable square as in claim 1 in which the inside surface of the blade is formed with a longitudinal recess, a rigid scale element is slidably mounted on the blade and in such longitudinal recess for rectilinear extension in parallel relation to the blade from the free end of the latter, the scale element having a flat surface coplanar to the inside surface of the blade and inscribed with measuring indices.

7. An adjustable square as in claim 1 in which said blade is of substantially the same width as the flat body face and is disposed against such face in the closed position of the blade and the body is formed with a stepped side surface providing a shoulder extending longitudinally along one side and dividing such side into flat surface portions parallel to one another, one such surface being offset from the other toward the body groove containing the lead screw, one of the side edges of the flat body face and the side edge of the blade adjacent thereto being in the plane of said one such surface to permit opening of the blade with said one such surface portion laid flatwise against a flat surface of a structural member, and a spirit level recessed into the other flat side surface portion of the body so as to be exposed to view when the square is in use with the body shoulder abutted against a structural member.

8. An adjustable square comprising an elongated body formed with a longitudinally extending groove and having a flat working face, a blade having a flat working face, means hinging one end of the blade to one end of the body for swinging movement of the blade relative to the body about an axis adjacent and parallel to the body face between an open position in which the blade face extends as a continuation of the body face and a closed position in which the blade face is disposed in confronting relation to the body face, said groove comprising a relatively narrow portion at the one end of the body and a relatively wide portion continuous with the narrow portion and extending from the latter toward the other end of the body, both the wide and narrow portions of the groove being open through the body face, a lead screw carried by the body and extending longitudinally through the wide portion of the groove, a block carried as a nut on the lead screw for to and fro longitudinal movement in the wide portion of the groove upon rotation of the lead screw, the block being confined by and having sliding engagement with the walls of the groove throughout the extent of the movement of the block longitudinally in the groove to restrain the block against rotation relative to the body, a link having its ends pivotally connected to the block and blade and arranged so that travel of the block along the lead screw swings the blade about its pivot axis between said open and closed positions and into various positions of angularity relative to the body, said block having a pointer disposed for movement along the flat body face, said body face carrying indicia representing angular relationships between the blade and the body corresponding to various positions of the pointer, and in the open position of the blade said link being received in the narrow portion of the groove wholly below the plane of the working surface of the body.

9. An adjustable square comprising an elongated body formed with a longitudinally extending groove and having a flat working face, a blade having a flat working face, means hinging one end of the blade to one end of the body for swinging movement of the blade relative to the body about an axis adjacent and parallel to the body face between an open position in which the blade face extends as a continuation of the body face and a closed position in which the blade face is disposed against the body face, the groove being open through the body face and having an opening through said one end of the body continuous with the opening through the face, said hinging means comprising elements spaced from one another along said axis in the provision of a gap between such hinge elements disposed in alignment with the end opening of the groove, a lead screw carried by the body and extending longitudinally through the groove, a block carried as a nut on the lead screw for to and fro longitudinal movement in the groove upon rotation of the lead screw, means restraining the block against rotation relative to the body, and a link having its ends pivotally connected to the block and blade and arranged so that travel of the block along the lead screw swings the blade about its pivot axis between said open and closed positions and into various positions of angularity relative to the body, said link in the open position of the blade being received in the groove wholly below the plane of the working surface of the body in recessed relation thereto and projecting through said end opening of the groove and said gap between the hinge elements.

10. An adjustable square as defined in claim 9 comprising detent means carried by the body and engageable with the link adjacent the center of the latter to retain the link in said recessed relation.

11. An adjustable square as defined in claim 10 in which the detent means comprises an element carried by one of the hinge elements for relative movement along the hinge axis and resilient means reacting against the body and the detent element to bias the latter toward and against the link when the link is disposed in said gap between the hinge elements.

References Cited in the file of this patent

UNITED STATES PATENTS

| | | |
|---|---|---|
| 533,200 | Nuhn | Jan. 29, 1895 |
| 1,045,695 | Goldwater | Nov. 26, 1912 |
| 1,210,370 | Dvorak | Dec. 26, 1916 |
| 1,394,323 | Matson | Oct. 18, 1921 |
| 1,590,575 | Granstrom | June 29, 1926 |
| 1,683,509 | Wescott | Sept. 4, 1928 |
| 2,142,387 | Udell | Jan. 3, 1939 |
| 2,185,443 | Kreutz | Jan. 2, 1940 |
| 2,292,094 | Thomas | Mar. 20, 1941 |
| 2,466,829 | Sprinkel | Apr. 12, 1949 |
| 2,683,933 | McFarland | July 20, 1954 |

FOREIGN PATENTS

| | | |
|---|---|---|
| 22,315 | England | Dec. 7, 1900 |
| 16,476 | England | 1904 |
| 67,128 | Switzerland | Oct. 2, 1913 |
| 266,920 | Switzerland | May 16, 1950 |